(12) United States Patent
Spain

(10) Patent No.: US 7,450,019 B1
(45) Date of Patent: Nov. 11, 2008

(54) OUTPUT MONITORING SYSTEM AND METHOD FOR AN AIR TRANSPORT MATERIAL DELIVERY SYSTEM

(76) Inventor: Robin L. Spain, HCR 2, Box 25, Olton, TX (US) 79064

( * ) Notice: Subject to any disclaimer, the term of this patent is extended or adjusted under 35 U.S.C. 154(b) by 358 days.

(21) Appl. No.: 11/431,832

(22) Filed: May 11, 2006

(51) Int. Cl.
*G08B 21/00* (2006.01)
(52) U.S. Cl. .................. 340/612; 340/674; 340/684; 111/174; 111/175; 111/179; 111/200; 427/8
(58) Field of Classification Search ............... 340/612, 340/674, 684; 111/174, 175, 179, 200; 427/8
See application file for complete search history.

(56) References Cited

U.S. PATENT DOCUMENTS

| | | | | |
|---|---|---|---|---|
| 5,170,730 A | * | 12/1992 | Swallow | 111/174 |
| 5,485,962 A | * | 1/1996 | Moss | 239/655 |
| 5,831,542 A | | 11/1998 | Thomas et al. | |
| 5,915,313 A | * | 6/1999 | Bender et al. | 111/178 |
| 7,140,310 B2 | * | 11/2006 | Mayerle et al. | 111/175 |
| 2002/0107625 A1 | | 8/2002 | Beck et al. | |

* cited by examiner

*Primary Examiner*—Tai T Nguyen
(74) *Attorney, Agent, or Firm*—Jacobson Holman PLLC

(57) ABSTRACT

An output monitoring system and method for an air transport material delivery system that directs dry material entrained in pressurized air out of delivery tubes and against an inner surface of deflectors for even distribution. The output monitoring system has a plurality of sensors respectively affixed to the deflectors on the outer side thereof so as not to be directly contacted by the stream of air and dry material impacting the inner side. Each sensor generates a voltage which is indicative of the flowing or clogged condition of its corresponding delivery tube. This status information is dynamically provided to a display unit where it can be readily monitored by the operator of the air transport material delivery system during operation thereof to ensure that the delivery tubes are not blocked or, if a blockage occurs, that operation of the air transport material delivery system is suspended until the blockage is removed.

19 Claims, 4 Drawing Sheets

OUTPUT MONITORING SYSTEM AND METHOD FOR AN AIR TRANSPORT MATERIAL DELIVERY SYSTEM

BACKGROUND OF THE INVENTION

1. Field of the Invention

The present invention is related to the field of application equipment for distributing dry material onto a field or the like and, more particularly, to an automatic output monitoring system for an air transport material delivery system.

2. Description of the Related Art

One method for spreading seeds or powder type fertilizers onto a field is to use a pressurized air transport material delivery system mounted to a tractor. The seed, fertilizer or other dry material is fed from a storage hopper to a manifold via a series of holes and funnels. In the manifold, the material is mixed with pressurized air from a turbine or compressor and sent down a set of horizontal delivery tubes from which the material exits at a high rate of speed. At the exit end of each tube, a metal deflector is positioned that redirects the material impinging on its inner surface downwardly, and disperses the redirected material evenly on the ground.

The air transport material delivery system may have up to 20 tubes, each of a different length. They are usually spaced evenly along a boom carried by the tractor in order to cover the most ground. The shortest tubes terminate immediately behind the tractor and the longest tubes generally extend out about 35 feet on either side of the tractor. In the case of a system with 20 tubes, ten tubes will extend out on each of the left and right sides.

A common problem encountered with machine-mounted air transport material delivery systems is that the funnels, orifices and tubes can become partially or completely blocked during operation. When this occurs, the driver of the machine may not realize there is a problem because the dust and small particle size make it very difficult for a loss in spread pattern to be visually perceived. Furthermore, the driver's position does not allow him or her to see the entire boom, but only the outermost deflectors. At a result, even if the spread pattern of the outermost deflectors could be visually monitored, blockage of the innermost deflectors would still go undetected. When blockage occurs, the driver may, without being aware of the existence of the problem, thereafter cover several acres while providing inadequate dry material distribution.

A system described in U.S. Pat. No. 5,831,542 for monitoring air seeder blockage uses a flexible piezoelectric element placed directly in the air/seed stream. Seed flow is detected on the basis of seeds striking the piezoelectric element, with seed flow rate being determined by counting the number of seed strikes. However, the piezoelectric element is susceptible to damage due to the continual bombardment thereof by the seed stream and may also be subject to other drawbacks and damage.

SUMMARY OF THE INVENTION

In view of the foregoing, the present invention provides a highly durable output monitoring system capable of reliably detecting a blockage in an air transport material delivery system for distributing dry material, such as seeds and fertilizer, over a geographic area.

In accordance with this and other objects, the present invention is directed to an output monitoring system for an air transport material delivery system having a storage hopper, a source of pressurized air and a plurality of delivery tubes which convey dry material entrained in the pressurized air from the storage hopper to respective tube exits. The air and entrained material exiting the tubes is deflected downwardly by a plurality of deflectors positioned adjacent the tube exits, thereby distributing the dry material evenly over a geographic area.

The output monitoring system includes a plurality of sensors, each of which is affixed to a deflector, but affixed in such a way so as not to be directly impacted by the stream of air and entrained material contacting the deflector. The sensors provide input to a respective plurality of sensor circuits which each convert the input into a voltage. The voltage inputs are provided to a concentrator circuit which monitors the inputs from each of the sensors and provides delivery tube status information to a display unit. This delivery tube status information can be readily monitored by the operator of the air transport material delivery system during operation thereof to ensure that the delivery tubes are not blocked or, if a blockage does occur, that operation of the system is suspended until the blockage is removed.

In a preferred form, the sensors are embodied as piezoelectric elements which are mounted on the outside of the deflectors.

Accordingly, it is an object of the present invention to automatically monitor and report the condition of a plurality of dry material delivery tubes during operation of an air transport material delivery system.

Another object of the present invention is to provide an an output monitoring system for an air transport material delivery system that detects the absence of dry material impact with at least one of a plurality of output deflectors using a sensor that detects changes in mechanical vibration to determine associated delivery tube blockage.

A further object of the present invention is to provide an output monitoring system for an air transport material delivery system that uses a piezoelectric sensing element to transform flexing movement in an output deflector into a voltage to determine the condition of an associated delivery tube.

A still further object of the present invention is to provide an output monitoring system for an air transport material delivery system that automatically notifies the operator of a clogged delivery tube.

Yet another object of the present invention is to provide an output monitoring system for an air transport material delivery system in which piezoelectric sensing elements are secured to the backs of output deflectors so as not to be impacted by the air and dry material output stream exiting the delivery tubes.

Still a further object of the present invention is to provide an output monitoring system for an air transport material delivery system in which material flow against a plurality of output deflectors is detected on the basis of sound.

Yet another object of the present invention to provide an output monitoring system for an air transport material delivery system that is not complex in structure and which can be manufactured at low cost while yet efficiently and dynamically monitoring and reporting delivery tube condition.

These together with other objects and advantages which will become subsequently apparent reside in the details of construction and operation as more fully hereinafter described and claimed, reference being had to the accompanying drawings forming a part hereof, wherein like numerals refer to like parts throughout. The drawings are not intended to be to scale.

DETAILED DESCRIPTION OF THE PREFERRED EMBODIMENTS

Figure 1:
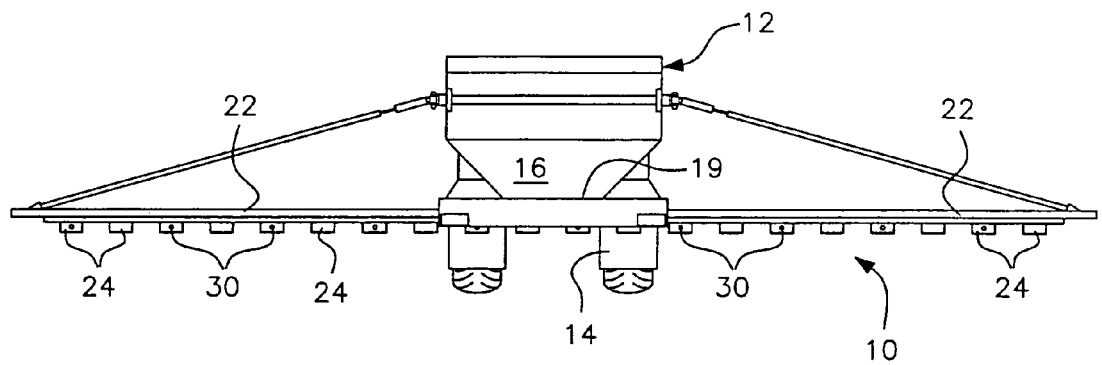
FIG. 1 shows an air transport material delivery system mounted at the rear of a tractor with an output monitoring system in accordance with the present invention.

In describing a preferred embodiment of the invention illustrated in the drawings, specific terminology will be resorted to for the sake of clarity. However, the invention is not intended to be limited to the specific terms so selected, and it is to be understood that each specific term includes all technical equivalents which operate in a similar manner to accomplish a similar purpose.

Figure 2:
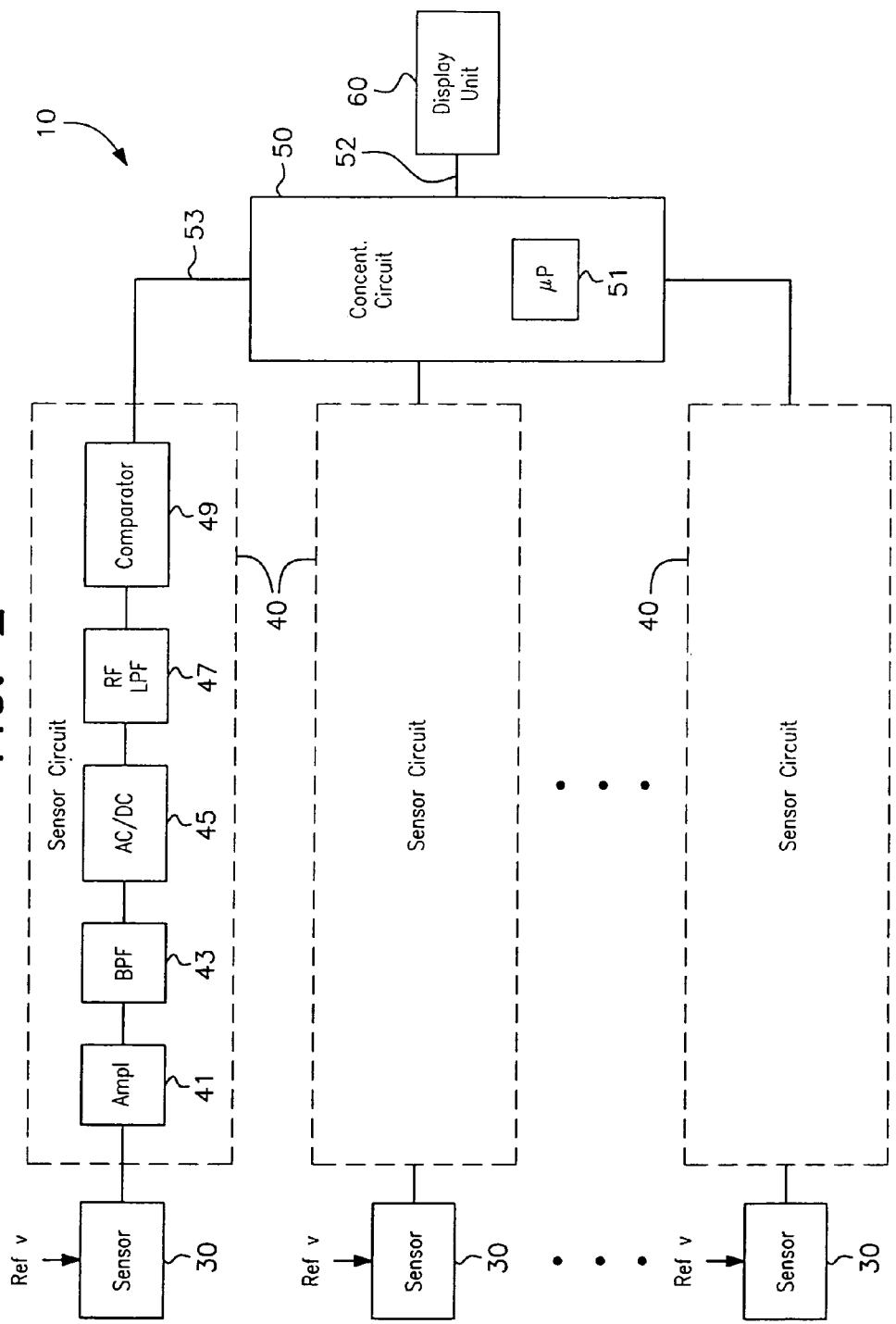
FIG. 2 is a block diagram of the output monitoring system in accordance with the present invention.

As broadly depicted in FIG. 1 and summarized in the block diagram of FIG. 2, the present invention is directed to an output monitoring system generally designated by the reference numeral 10, having a plurality of sensors 30 mounted to operate with an air transport material delivery system generally designated by the reference numeral 12. The air transport material delivery system 12 is carried by a transport vehicle such as tractor 14. Material to be delivered by the system can include, among other things, seeds and fertilizer which, for the purposes of ease in discussion, will be generally referred to hereinafter as "dry material".

Figure 3:
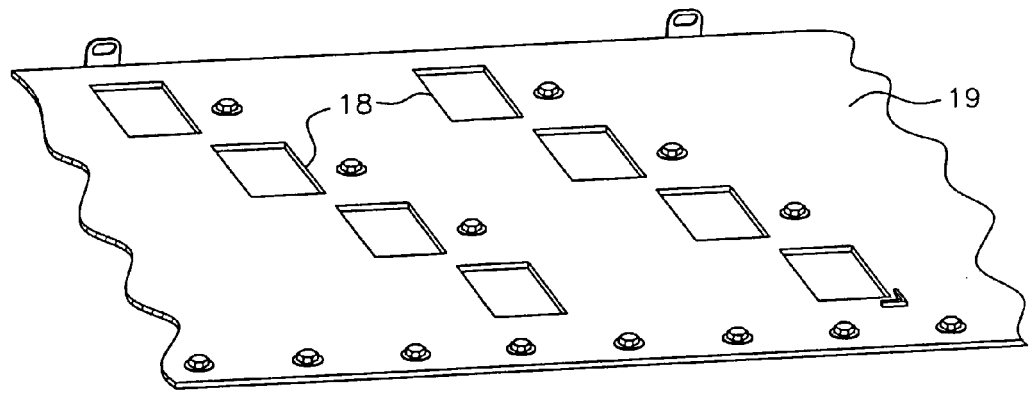
FIG. 3 shows a hopper base plate with orifices therein for dry material flow within the air transport material delivery system of FIG. 1.

The air transport material delivery system 12 is of conventional design, including a hopper 16 that directs dry material to a manifold (not shown) via a series of funnels or orifices 18 in a base plate 19, as representatively shown in FIG. 3. In the manifold, the dry material is mixed with pressurized air from a turbine or compressor (not shown) and sent down a set of generally horizontal delivery tubes 20 (see FIG. 4) distributed along a boom 22 for distribution onto a field or other geographic area. This sort of air transport material delivery system is known in the art and therefore further details are not set forth herein.

Figure 4:
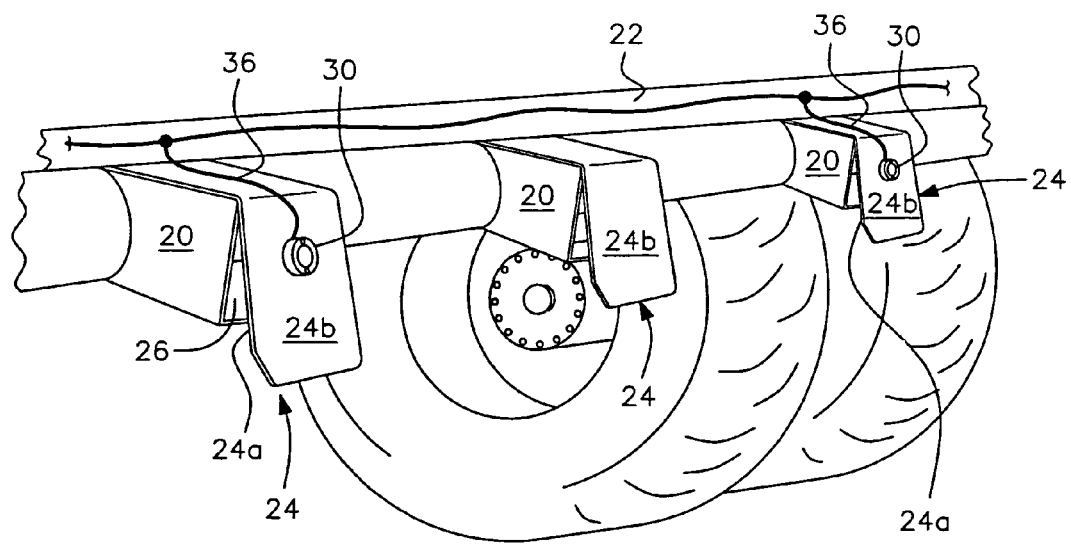
FIG. 4 is a perspective view of a portion of the air transport material delivery system mounted on a tractor of FIG. 1, showing the sensors of the output monitoring system.

As shown in more detail in FIG. 4, a metal deflector 24 is placed adjacent the exit 26 of each of the delivery tubes 22. Dry material exiting the delivery tubes 22 impacts the inside surface or inner side 24a of the metal deflector 24 and is redirected by such impact in a downward direction so as to be evenly distributed over the ground.

The number of delivery tubes in the air transport material delivery system 12 can vary but for ease of explanation a system having twenty delivery tubes will be described. The exits 26 of these tubes are typically spaced evenly along the boom 22 carried by the tractor. The length of the boom 22 can also vary, but typically is on the order of 60 feet, such that the boom extends approximately 30 feet from each side of the tractor 14. Hence, in the example being described, ten delivery tubes extend out along the 30 feet of boom length from each side of the tractor.

Given the span of the boom 22, the delivery tubes 20 have different lengths depending upon the positions of their corresponding exits along the boom. The shortest tubes 20 terminate immediately behind the tractor, while the longest tubes 20 extend along the entire span of one side of the boom.

As previously discussed, a problem often arises when one or more of the delivery tubes 20 becomes blocked without such condition being detected by the operator of the tractor. To avoid this undetected blockage condition, the output monitoring system 10 according to the present invention includes a plurality of sensors 30, one of which is mounted to the outside surface or outer side 24b of each deflector 24. As disclosed herein, the outer side is opposite the inner side, but it is possible that a flange portion or other extension portion of the deflector, if present, could be used to support the sensor, provided that the sensor can be positioned thereon so as not to be impacted by the air stream and dry material output of the delivery tubes.

Figure 5:
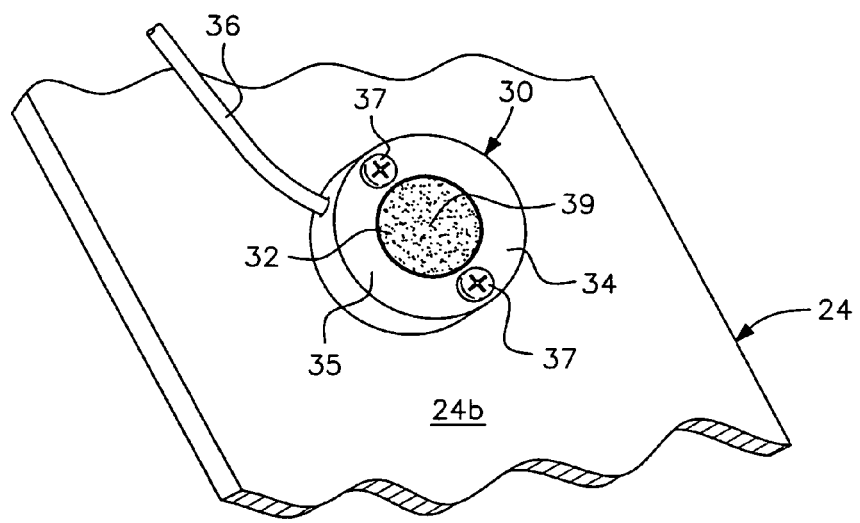
FIG. 5 is a more detailed view of one of the sensors of FIG. 4.

According to one preferred embodiment shown in detail in FIG. 5, the sensor 30 is a piezoelectric disk element 32 held by a mounting structure generally designated by the reference numeral 34, which is coupled to the deflector 24. The mounting structure 34 can be embodied as a DELRIN and PVC cup 35 or similar material, secured to the outer side 24b of the deflector 24 by any suitable fasteners such as bolts 37. The piezoelectric disk 32 is held around its edges by the cup 35 so as to allow the center 39 of the disk to flex freely and thereby transform the movements of the deflector 24 into electrical voltages which are conveyed over a wired connection 36. The voltages generated by the piezoelectric disk 32 are representative of the amplitude and frequency spectrum generated by the impacts of the dry material on the inner surface or side 24a of the metal deflector 24.

The piezoelectric disk 32 can have a conventional sandwich construction of two metal plates on either side of a piezoelectric crystal. With this construction, the bottom plate is driven by a reference voltage RefV and the top plate is used to measure any voltages generated by the flexing of the disk. According to a preferred embodiment, the reference voltage is 2.5 volts such that the signal generated by the piezoelectric disk is an AC voltage centered on 2.5 volts.

The piezoelectric disk 32 will transform any flexing movement into a voltage. Mechanical vibrations, such as meshing gears, running engines or tires impacting the ground, are low frequency, generally less than 10 kHz, and generate peak-to-peak voltages on the order of hundreds of millivolts. Vibrations due to dry material impacting the metal deflector, on the other hand, tend to be above 20 kHz, generating peak-to-peak voltages on the order of only tens of millivolts or less.

Through experimentation it has been determined that various dry materials such as wheat, urea and ammonium sulfate, when delivered at various rates of 50, 137 and 200 lbs, all generate a peak in the energy spectrum in the ultrasonic frequency range of 40 kHz to 50 kHz. At the frequency of interest of 45 kHz, the piezoelectric disk will generate peak-to-peak voltages of approximately 12 mv to 160 mv due to the impact of the dry material against the metal deflector. This signal is in addition to the high amplitude, low frequency voltage generated due to mechanical vibrations, and is absent when no dry material is flowing, even though the air stream may still be present.

To detect this peak, a sensor circuit 40 is coupled to each of the sensors 30, respectively, as shown in FIG. 2. Each sensor circuit is used to amplify, filter and generate a DC voltage that is representative of the amount of energy which is present at 45 kHz. The magnitude of this DC voltage is then used to indicate each delivery tube's condition, i.e., whether dry material in the tube is clogged or flowing.

More specifically, the sensor circuit includes an amplifier 41 that amplifies the voltage from the sensor 30. The degree of amplification is limited to prevent clipping of the amplified signal, but is representatively a factor of four. The amplified signal is then passed through a band-pass filter 43 having a center frequency of about 45 kHz and stop band edges at about 40 kHz and 50 kHz, where it is further amplified and filtered. The overall gain of the band-pass filter 43 is representatively about 47.5.

The amount of energy in the signal is determined by converting the AC output from the band-pass filter 43 to a DC level using an AC/DC converter 45 which can be embodied as a half-wave rectifier. Specifically, since the AC signal from the filter 43 is centered on 2.5 volts, half-wave rectification is performed by level shifting the signal from 2.5 volts down to 0 volts. This clipped AC signal is amplified, preferably by a factor of five, and fed through a simple resistance-capacitance (RC) low-pass filter 47 to generate the DC level. The result is a DC voltage that is representative of the amount of energy present at 45 kHz. The DC voltage is amplified, preferably by a factor of six, and presented to a comparator 49 with hysteresis to determine the flow state of the delivery tube.

The combination of the RC low-pass filter 47 and the comparator 49 is used to prevent false indications. Because of the long time-constant of the RC filter 47, generally about 1 second, momentary changes or disruptions in the flow of dry material will result in small changes in the DC voltage from the RC filter, but will not change the tube's flow status as indicated by the comparator 49. Instead, a significant change in the tube flow, either from free flowing to plugged or vice versa, is required in order to effect a large enough change in voltage to alter the output state of the comparator 49. Specifically, the signal must be above three volts before a "flow" condition is indicated and must be below two volts before a "clogged" condition is indicated. According to this preferred embodiment, the output of the comparator 49 is low for a flowing condition and high for a clogged condition but this could be reversed such that the output of the comparator 49 is high for a flowing condition and low for a clogged condition, as would be understood by persons of ordinary skill in the art.

In order to minimize the number of wires entering the cab of the tractor 14, the outputs of all of the sensor circuits 40 are fed to a concentrator circuit 50 that is preferably mounted on one or more circuit boards (not shown) with the sensor circuits. A microprocessor 51 in the concentrator circuit 50' monitors all of the inputs from the sensor circuits 40 and concentrates the results to produce a series of short messages that are sent over a wired connection 52 to the display unit 60, representatively illustrated in FIG. 6, which is generally mounted in the tractor cab. These messages are sent continuously in order to notify the operator on a real-time basis of any changes in flow conditions. The messages are sent serially (one start bit, one stop bit, no parity) over the wired connection 52 via RS-485. Representative message format is summarized below:

| Message # | Data |
|---|---|
| 0 | Status of left tubes 1-5 |
| 1 | Status of left tubes 6-10 |
| 2 | Status of right tubes 1-5 |
| 3 | Status of right tubes 6-10 |
| 4 | Number of channels being monitored |

Since not all output monitoring systems in accordance with the present invention will use all twenty of the sensors 30, the present invention includes a switching mechanism 61 that allows the operator to select how many of the sensors 30 are to be monitored. This switching mechanism 61 may be embodied as a rotary switch that allows the operator to select a value of from between 0 and 9. For instance, selecting "6" would allow the operator to monitor six left side delivery tubes and six right side delivery tubes for a total of twelve channels. Selecting "0" would enable the operator to monitor all ten left side delivery tubes and all ten right side delivery tubes for a total of twenty channels.

Figure 6:
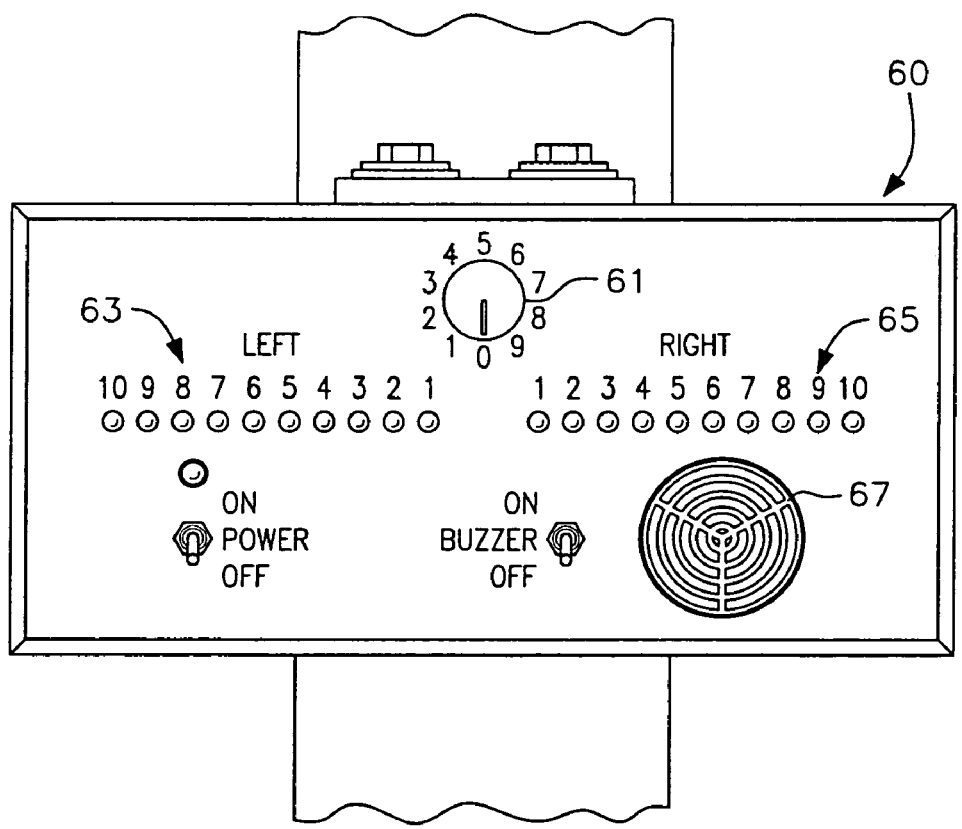
FIG. 6 illustrates the display unit of the output monitoring system of FIG. 2.

As shown in FIG. 6, the display unit 60 also includes a plurality of numbered LEDs 63, 65 and a sound generating mechanism 67 such as a buzzer. According to the embodiment being described, the display unit includes 20 LEDs, ten left side LEDs 63 for the delivery tubes on the left side of the boom, and ten right side LEDs 65 for the delivery tubes on the right side of the boom. A microprocessor (not shown) in the display unit 60 decodes the incoming serial messages and drives the LEDs 63, 65 to inform the operator of the flow condition of each delivery tube.

According to a preferred embodiment, the LEDs 63, 65 are normally "off". When a clogged tube condition is detected, the LED corresponding with the clogged tube is turned on and the buzzer 67 is activated. Alternatively, the LEDs 63, 65 being monitored may be illuminated at the outset to indicate flowing condition. Upon detection of a clogged condition, the corresponding LED would then be turned off. In either case, the buzzer 67 would activate upon detection of a clogged condition to provide an audible indication.

Message #4 generated by the microprocessor 51 informs the display unit 60 of the number of channels being monitored, as set by the switching mechanism 61. If not all of the channels are being monitored, and if the "off" condition of the LEDs is the indicator of proper flow status, the LEDs corresponding with the unmonitored tubes are permanently turned off. For example, if the system uses 16 delivery tubes, eight tubes on the right and eight tubes on the left, then the LEDs for the ninth and tenth delivery tubes on each side are turned off. Conversely, if the LEDs are set to be illuminated to indicate proper flow status, the LEDs corresponding with the unmonitored tubes are permanently turned on.

There are at least three failure conditions that the output monitoring system 10 detects and reports to the operator. First, if the wired connection 36 connecting the piezoelectric sensor 32 to the sensor circuit 40 breaks or becomes disconnected, a "clogged" condition is indicated for that particular sensor. Second, if the wire 53 connecting the sensor circuit 40 to the concentrator circuit 50 breaks or becomes disconnected, a "clogged" condition is indicated for that particular sensor. Third, if the communication wires 52 from the concentrator circuit 50 to the display unit 60 break or become disconnected, all of the LEDs 63, 65 will indicate a "clogged" condition.

The output monitoring system 10 is powered from the 12V electrical system of the tractor.

The present invention may further be embodied as a method of monitoring output from an air transport material delivery system that entrains dry material in pressurized air for conveyance through a plurality of delivery tubes to respective tube exits where the dry material is impacted against a plurality of deflectors positioned adjacent the tube exits for distribution over a geographic area. The method includes positioning a sensor on the outer or non-impacted side of at least one of the deflectors which is positioned adjacent a respective delivery tube and generating, by the sensor, an AC voltage in response to vibration at a frequency. The AC voltage is filtered to pass a signal with a frequency range of between about 40 kHz and 50 kHz, and then converted into a DC voltage representative of the amount of energy present at about 45 kHz. Based on this DC voltage, the flow status of dry material through the respective delivery tube can be determined.

The foregoing descriptions and drawings should be considered as illustrative only of the principles of the invention. The invention may be configured in a variety of shapes and sizes and is not limited by the dimensions of the preferred embodiment. Numerous applications of the present invention will readily occur to those skilled in the art. Therefore, it is not desired to limit the invention to the specific examples disclosed or the exact construction and operation shown and described. Rather, all suitable modifications and equivalents may be resorted to, falling within the scope of the invention.

What is claimed is:

1. An output monitoring system for an air transport material delivery system having a storage hopper, a source of pressurized air, a plurality of delivery tubes which convey dry material entrained in said pressurized air to respective tube exits, and a plurality of deflectors positioned adjacent to said tube exits for downwardly distributing the dry material impacting an inner side of said deflectors over a geographic area, said output monitoring system comprising:
   a plurality of vibration-detecting sensors respectively affixed to said plurality of deflectors so as not to be directly impacted by said dry material entrained in said pressurized air leaving said tube exits;
   a plurality of sensor circuits respectively coupled to said plurality of sensors, each sensor circuit receiving an input from an associated sensor;
   a concentrator circuit for receiving inputs from said plurality of sensor circuits and for generating respective delivery tube status information for each monitored delivery tube; and
   a display unit coupled to said concentrator circuit for displaying said delivery tube status information to an operator of said air transport material delivery system.

2. The output monitoring system as set forth in claim 1, wherein said sensors are piezoelectric disks.

3. The output monitoring system as set forth in claim 2, wherein said inputs received by the sensor circuits are AC voltages and said sensor circuits are configured to convert said AC voltages into DC voltages.

4. The output monitoring system as set forth in claim 3, wherein said sensor circuits each comprise:
   a band-pass filter for filtering and amplifying the AC voltage input from a respective sensor;
   a converter for generating a DC signal from said AC signal following half-wave rectification; and
   a comparator coupled to said converter for receiving said DC signal and generating an output indicating a flow status of a respective delivery tube.

5. The output monitoring system as set forth in claim 4, further comprising a low-pass filter between said converter and said comparator.

6. The output monitoring system as set forth in claim 4, wherein said band-pass filter has a center frequency of about 45 kHz and stop band edges at about 40 kHz and 50 kHz.

7. The output monitoring system as set forth in claim 6, wherein said DC signal represents an amount of energy present at 45 kHz.

8. The output monitoring system as set forth in claim 3, wherein the AC voltage generated by each piezoelectric disk is centered on about 2.5 volts, and said sensor circuit includes a comparator having an output state that changes when an incoming signal is above about 3 volts or less than about 2 volts.

9. The output monitoring system as set forth in claim 1, wherein said sensors are mounted to an outer side of said deflectors opposite said inner side.

10. The output monitoring system as set forth in claim 1, wherein each of said sensor circuits converts an AC voltage input from a respective sensor into a DC voltage that is representative of an amount of energy present at about 45 kHz.

11. The output monitoring system as set forth in claim 10, wherein each sensor is a piezoelectric disk generating peak-to-peak voltages of approximately 12 mv to 160 mv in response to impact of dry material against the deflector to which said sensor is affixed.

12. The output monitoring system as set forth in claim 1, wherein said display unit includes a plurality of LEDs, each LED corresponding with a respective delivery tube to indicate a flow or clogged condition thereof.

13. The output monitoring system as set forth in claim 12, wherein said display unit includes a sound generating mechanism for audibly signaling a clogged delivery tube condition.

14. An output monitoring system for an air transport material delivery system that conveys dry material entrained in pressurized air through a plurality of delivery tubes to respective tube exits where the dry material is impacted against a plurality of deflectors respectively positioned adjacent to said tube exits for distributing the dry material downward onto a geographic area, said output monitoring system comprising:
   at least one sensor affixed to a non-impacted side of one of said deflectors having an associated delivery tube, said sensor for detecting vibration and generating an AC voltage representative of said vibration;
   a sensor circuit coupled to said sensor and converting said AC voltage into a DC voltage;
   a concentrator circuit for receiving said DC voltage from said sensor circuit and for generating status information for said associated delivery tube based on said DC voltage; and
   a display unit coupled to said concentrator circuit for conveying said delivery tube status information to an operator of said air transport material delivery system.

15. The output monitoring system as set forth in claim 14, wherein said sensor is a piezoelectric disk generating peak-to-peak voltages of approximately 12 mv to 160 mv in response to impact of dry material against the deflector to which said sensor is affixed.

16. The output monitoring system as set forth in claim 15, wherein the AC voltage generated by said piezoelectric disk is centered on 2.5 volts, and said sensor circuit includes a comparator having an output state that changes when an incoming signal is above about 3 volts or less than about 2 volts.

17. The output monitoring system as set forth in claim 14, wherein said sensor circuit includes a band-pass filter having a center frequency of about 45 kHz and respective stop band edges at about 40 kHz and 50 kHz, and a converter downstream from said band-pass filter for generating a DC voltage that represents an amount of energy present at about 45 kHz.

18. The output monitoring system as set forth in claim 14, wherein said display unit includes an LED corresponding with said sensor and associated delivery tube to indicate a flow or clogged condition thereof, and a sound generating mechanism for audibly signaling a clogged delivery tube condition.

19. A method of monitoring output from an air transport material delivery system that entrains dry material in pressurized air for conveyance through a plurality of delivery tubes to respective tube exits where the dry material is impacted against a plurality of deflectors positioned adjacent said tube exits for distribution over a geographic area, said method comprising:

positioning a vibration detecting sensor on one of said plurality of deflectors so as not to be impacted by said dry material exiting said respective delivery tube;

generating, by said sensor, an AC voltage in response to vibration at a frequency;

filtering said AC voltage to pass a signal with a frequency range of between about 40 kHz and 50 kHz;

converting said signal into a DC voltage representative of an amount of energy present at about 45 kHz; and determining a flow status of dry material through said respective delivery tube from said DC voltage.

\* \* \* \* \*